(12) United States Patent
Servignat et al.

(10) Patent No.: US 11,039,189 B2
(45) Date of Patent: Jun. 15, 2021

(54) METHOD FOR CONTROLLING ACCESS TO BROADCAST CONTENT

(71) Applicant: NAGRAVISION S.A., Cheseaux-sur-Lausanne (CH)

(72) Inventors: David Servignat, Ceyreste (FR); Jose-Emmanuel Pont, Cheseaux-sur-Lausanne (CH); Frederic Thomas, Onex (CH); Scott Jantz, Gainesville, FL (US); Nir Livay, Gainesville, FL (US)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 40 days.

(21) Appl. No.: 16/699,241

(22) Filed: Nov. 29, 2019

(65) Prior Publication Data

US 2020/0099971 A1 Mar. 26, 2020

Related U.S. Application Data

(63) Continuation of application No. 14/917,090, filed as application No. PCT/EP2014/068805 on Sep. 4, 2014, now abandoned.
(Continued)

(30) Foreign Application Priority Data

Sep. 27, 2013 (EP) ..................................... 13186380

(51) Int. Cl.
*H04N 21/258* (2011.01)
*H04N 21/266* (2011.01)
(Continued)

(52) U.S. Cl.
CPC ... *H04N 21/25841* (2013.01); *H04N 21/2541* (2013.01); *H04N 21/25816* (2013.01);
(Continued)

(58) Field of Classification Search
None
See application file for complete search history.

(56) References Cited

U.S. PATENT DOCUMENTS

| 5,451,757 A | 9/1995 | Heath, Jr. |
| 6,317,500 B1 | 11/2001 | Murphy |
| (Continued) | | |

FOREIGN PATENT DOCUMENTS

| FR | 2861237 | 4/2005 |
| JP | 2007264835 A | 10/2007 |
| (Continued) | | |

OTHER PUBLICATIONS

English language translation of International Search Report issued in PCT/EP2014/068805 dated Nov. 18, 2014.
(Continued)

*Primary Examiner* — An Son P Huynh
(74) *Attorney, Agent, or Firm* — Oblon, McClelland, Maier & Neustadt, L.L.P.

(57) ABSTRACT

The present invention relates to the domain of control of access to audiovisual content transmitted to a receiver, in particular control based on the localization of the receiver. This invention proposes a method of control of access to content transmitted to a receiver, said receiver being part of an access geographic control system comprising verification means and security means, the method comprising the following steps:
 acquisition of a current localization by a portable device,
 transfer of the current localization to the verification means,
 extraction, in a memory of the verification means, of a localization data set defining at least one area,
 verification, by the verification means, that the current localization is included in said area, and if so, trans-
(Continued)

mission of an authorization message for the reception of the audiovisual content to the security means relative to the receiver.

20 Claims, 4 Drawing Sheets

Related U.S. Application Data

(60) Provisional application No. 61/877,297, filed on Sep. 13, 2013.

(51) Int. Cl.
| | |
|---|---|
| *H04N 21/414* | (2011.01) |
| *H04N 21/422* | (2011.01) |
| *H04N 21/45* | (2011.01) |
| *H04N 21/4627* | (2011.01) |
| *H04N 21/4623* | (2011.01) |
| *H04N 21/41* | (2011.01) |
| *H04N 21/4223* | (2011.01) |
| *H04N 21/418* | (2011.01) |
| *H04N 21/254* | (2011.01) |
| *H04N 21/475* | (2011.01) |

(52) U.S. Cl.
CPC ... *H04N 21/26606* (2013.01); *H04N 21/4126* (2013.01); *H04N 21/4181* (2013.01); *H04N 21/41407* (2013.01); *H04N 21/422* (2013.01); *H04N 21/4223* (2013.01); *H04N 21/42204* (2013.01); *H04N 21/4524* (2013.01); *H04N 21/4623* (2013.01); *H04N 21/4627* (2013.01); *H04N 21/4753* (2013.01)

(56) References Cited

U.S. PATENT DOCUMENTS

| | | |
|---|---|---|
| 6,480,958 B1 | 11/2002 | Harrington |
| 7,287,692 B1 | 10/2007 | Patel |
| 7,530,085 B2 | 5/2009 | Tsuria |
| 7,650,509 B1 | 1/2010 | Dunning |
| 8,185,927 B2 | 5/2012 | Karaoguz |
| 8,352,980 B2 | 1/2013 | Howcroft |
| 8,387,084 B1 | 2/2013 | Klappert et al. |
| 8,423,768 B2 | 4/2013 | Huang |
| 8,644,840 B2 | 2/2014 | Gupta |
| 8,682,802 B1 | 3/2014 | Kannanari |
| 8,731,301 B1 | 5/2014 | Bushman |
| 8,824,664 B1 | 9/2014 | Ristock |
| 8,826,399 B2 | 9/2014 | Dorso |
| 8,925,053 B1 | 12/2014 | Mehta |
| 8,959,583 B2 | 2/2015 | Fadida |
| 9,009,794 B2 * | 4/2015 | Dykeman ............... G06F 21/10 726/4 |
| 9,032,495 B2 | 5/2015 | Zhang |
| 9,075,979 B1 | 7/2015 | Queru |
| 9,120,452 B2 | 9/2015 | Nishimoto |
| 9,262,771 B1 | 2/2016 | Patel |
| 9,262,877 B2 | 2/2016 | Ruckart |
| 9,503,779 B2 | 11/2016 | Wang |
| 9,661,388 B2 | 5/2017 | Phillips |
| 9,774,897 B2 | 9/2017 | Ellis |
| 2003/0058269 A1 | 3/2003 | Dunstan |
| 2003/0152207 A1 | 8/2003 | Ryan |
| 2003/0163483 A1 | 8/2003 | Zingher |
| 2003/0181160 A1 | 9/2003 | Hirsch |
| 2004/0117818 A1 | 6/2004 | Karaoguz |
| 2005/0024227 A1 | 2/2005 | Dunstan |
| 2005/0213519 A1 | 9/2005 | Relan |
| 2005/0226170 A1 | 10/2005 | Relan |
| 2005/0229222 A1 | 10/2005 | Relan |
| 2005/0229228 A1 | 10/2005 | Relan |
| 2005/0235307 A1 | 10/2005 | Relan |
| 2006/0020960 A1 | 1/2006 | Relan et al. |
| 2006/0059096 A1 | 3/2006 | Dublish |
| 2006/0085826 A1 | 4/2006 | Funk |
| 2006/0089152 A1 | 4/2006 | Mahonen |
| 2006/0155653 A1 | 7/2006 | Persokrud |
| 2006/0179003 A1 | 8/2006 | Steele |
| 2007/0016936 A1 | 1/2007 | Okada et al. |
| 2007/0067828 A1 | 3/2007 | Bychkov |
| 2007/0157281 A1 | 7/2007 | Ellis |
| 2007/0185718 A1 | 8/2007 | Di Mambro |
| 2007/0214364 A1 | 9/2007 | Roberts |
| 2007/0218979 A1 | 9/2007 | Momoda |
| 2007/0266396 A1 | 11/2007 | Estermann |
| 2007/0291944 A1 | 12/2007 | Wingert |
| 2008/0034216 A1 | 2/2008 | Law |
| 2008/0040265 A1 | 2/2008 | Rackley, III |
| 2008/0040274 A1 | 2/2008 | Uzo |
| 2008/0092154 A1 | 4/2008 | Hogyoku |
| 2008/0092157 A1 | 4/2008 | Walter |
| 2008/0098464 A1 | 4/2008 | Mizrah |
| 2008/0134309 A1 | 6/2008 | Qin |
| 2008/0208759 A1 | 8/2008 | Royyuru |
| 2009/0100402 A1 | 4/2009 | Heuler |
| 2009/0104888 A1 | 4/2009 | Cox |
| 2009/0125971 A1 * | 5/2009 | Belz ................. H04N 21/25816 725/153 |
| 2009/0249413 A1 | 10/2009 | Karaoguz |
| 2010/0017831 A1 | 1/2010 | Newell |
| 2010/0070759 A1 | 3/2010 | Leon Cobos |
| 2010/0136943 A1 * | 6/2010 | Hirvela ................... H04W 4/00 455/404.1 |
| 2010/0192180 A1 | 7/2010 | Olague |
| 2010/0192183 A1 * | 7/2010 | Hu ..................... H04N 21/6175 725/62 |
| 2010/0241571 A1 | 9/2010 | McDonald |
| 2010/0251292 A1 * | 9/2010 | Srinivasan ...... H04N 21/440218 725/37 |
| 2010/0304819 A1 | 12/2010 | Stockdale |
| 2011/0055866 A1 | 3/2011 | Piepenbrink |
| 2011/0069940 A1 * | 3/2011 | Shimy ................ H04N 5/44543 386/296 |
| 2011/0072452 A1 | 3/2011 | Shimy |
| 2011/0078717 A1 | 3/2011 | Drummond et al. |
| 2011/0099079 A1 | 4/2011 | White |
| 2011/0138064 A1 * | 6/2011 | Rieger ................. H04N 21/433 709/228 |
| 2011/0154383 A1 | 6/2011 | Hao |
| 2011/0164175 A1 * | 7/2011 | Chung ............... H04N 21/4126 348/468 |
| 2011/0271303 A1 | 11/2011 | Isozu |
| 2011/0283333 A1 | 11/2011 | Ukkadam |
| 2011/0289537 A1 | 11/2011 | Buehl |
| 2011/0298596 A1 | 12/2011 | Warrick |
| 2011/0314507 A1 | 12/2011 | Keen |
| 2012/0041271 A1 | 2/2012 | Rao |
| 2012/0047563 A1 | 2/2012 | Wheeler |
| 2012/0054818 A1 * | 3/2012 | Noh ................. H04N 21/25825 725/143 |
| 2012/0131611 A1 | 5/2012 | Yeap et al. |
| 2012/0144202 A1 | 6/2012 | Counterman |
| 2012/0168510 A1 | 7/2012 | Gratton |
| 2012/0214416 A1 | 8/2012 | Kent |
| 2012/0266224 A1 | 10/2012 | Gruschka |
| 2012/0284195 A1 | 11/2012 | McMillen |
| 2013/0013932 A1 | 1/2013 | Kong |
| 2013/0027613 A1 * | 1/2013 | Kim ................. H04N 21/43637 348/563 |
| 2013/0069772 A1 | 3/2013 | Najafi |
| 2013/0124740 A1 | 5/2013 | Liansky |
| 2013/0145403 A1 * | 6/2013 | Sofos ............... H04N 21/4126 725/62 |
| 2013/0159195 A1 | 6/2013 | Kirillin |
| 2013/0167170 A1 | 6/2013 | Klappert et al. |
| 2013/0173765 A1 * | 7/2013 | Korbecki ......... H04N 21/42209 709/221 |
| 2013/0201905 A1 | 8/2013 | Ling et al. |
| 2013/0203337 A1 | 8/2013 | Ling et al. |
| 2013/0203338 A1 | 8/2013 | Ling et al. |

(56) References Cited

U.S. PATENT DOCUMENTS

| | | |
|---|---|---|
| 2013/0203341 A1 | 8/2013 | Ling et al. |
| 2013/0203343 A1 | 8/2013 | Ling et al. |
| 2013/0205328 A1 | 8/2013 | Ling et al. |
| 2013/0227647 A1 | 8/2013 | Thomas |
| 2013/0255350 A1 | 8/2013 | Ling et al. |
| 2013/0262311 A1 | 10/2013 | Buhrmann |
| 2013/0262687 A1 | 10/2013 | Avery |
| 2013/0276078 A1 | 10/2013 | Rockwell |
| 2013/0340071 A1 | 12/2013 | Vellozo Luz |
| 2014/0007211 A1 | 1/2014 | Yang |
| 2014/0013106 A1 | 1/2014 | Redpath |
| 2014/0020117 A1 | 1/2014 | Nagai |
| 2014/0040941 A1 | 2/2014 | Rosenberg et al. |
| 2014/0089961 A1 | 3/2014 | Ling et al. |
| 2014/0096154 A1 | 4/2014 | Ohtake |
| 2014/0189831 A1 | 7/2014 | Kemshall |
| 2014/0230040 A1 | 8/2014 | Crowther |
| 2014/0236836 A1 | 8/2014 | Salonen |
| 2014/0250471 A1 | 9/2014 | Guerra |
| 2014/0250518 A1 | 9/2014 | Schneider |
| 2014/0274134 A1 | 9/2014 | Ling et al. |
| 2014/0279541 A1 | 9/2014 | Castrechini |
| 2014/0280981 A1 | 9/2014 | Singhal |
| 2014/0310742 A1 | 10/2014 | Kim |
| 2014/0331053 A1 | 11/2014 | Maruyama |
| 2015/0012986 A1 | 1/2015 | Sun |
| 2015/0050922 A1 | 2/2015 | Ramalinqam |
| 2015/0089607 A1 | 3/2015 | Hubner |
| 2015/0230004 A1 | 8/2015 | VanDuyn |
| 2015/0237031 A1 | 8/2015 | Neuman |
| 2015/0256824 A1 | 9/2015 | Ramachandran |
| 2016/0036809 A1 | 2/2016 | Bhimanaik |

FOREIGN PATENT DOCUMENTS

| | | |
|---|---|---|
| WO | WO 2011/011854 | 2/2011 |
| WO | WO 2013/061174 | 5/2013 |

OTHER PUBLICATIONS

English language translation of Written Opinion issued in PCT/EP2014/068805 dated Nov. 18, 2014.

English language abstract of FR 2861237 published Apr. 22, 2005.

* cited by examiner

METHOD FOR CONTROLLING ACCESS TO BROADCAST CONTENT

CROSS REFERENCE TO RELATED APPLICATIONS

This application is a continuation of U.S. patent application Ser. No. 14/917,090 filed Mar. 7, 2016, which is a U.S. National Stage of International Application No. PCT/EP2014/068805 filed Sep. 4, 2014, which claims priority from European Patent Application No. 13186380.5 filed Sep. 27, 2013 and U.S. Provisional Patent Application No. 61/877,297 filed Sep. 13, 2013. The entire contents of each of which are incorporated herein by reference.

INTRODUCTION

The present invention relates to the domain of control of access to audiovisual content transmitted to a receiver, in particular control based on the localization of the receiver.

PRIOR ART

There are several applications which require the geolocation of a receiver in the domain of transmission of audiovisual content. A first reason is the blackout function which consists in preventing the receivers in certain regions from accessing the content. This function has been introduced by the organizers of sports events in order to forbid the receivers which are in the same region as the event to access the event. This is to encourage the interested people to come and see the event rather than watching it in front of a television screen.

A second reason is the "account packing" function, that is the offer of a second or third content receiver at a reduced price. The condition is that these receivers remain in the same household to take advantage of the reduction. It is tempting to buy a second receiver at reduced price and install it at a friend's home. The knowledge of the position of the receivers allows to verify if the condition of proximity of the receivers is met.

A third reason which is similar to the "blackout" function is the management of broadcast rights by territory. An operator acquires the broadcast rights for a given territory. Nevertheless, a transmitted signal cannot follow arbitrary frontiers and the signal extends beyond the authorization area. The operator is then asked, in order to comply with their legal obligations, to set up technical means to avoid that the receivers out of their area be able to access the content.

That is why according to prior art (for example U.S. Pat. No. 6,317,500) it has been proposed to integrate a geolocation system in the receivers in order to control the access to the content.

The defect of these systems is that the reception of the geolocation satellites is not generally possible inside houses or flats. The object of the present invention is to provide a solution to this problem.

BRIEF DESCRIPTION OF THE INVENTION

The object of the present invention is to propose a localization verification method which cannot be circumvented by the simple transmission of a localization by a portable device situated far from the receiver, in particular to avoid that when the receiver is out of the authorization area, a portable device situated in the area is used for acquiring the localization and transmit it to verification means.

The present invention proposes a method for controlling access to content transmitted to a receiver, said receiver being part of an access geographic control system comprising verification means and security means, the method comprising the following steps:
- receiving a verification invitation message by the receiver,
- obtaining or generating of a unique code by the receiver,
- transmitting, to said verification means, said unique code or means to verify said unique code,
- transmitting said unique code to a portable device,
- acquiring a current localization by the portable device,
- transferring the current localization and the unique code of the portable device to the verification means,
- verifying the unique code received by the verification means, and if the code is correct,
- extracting, in a memory of the verification means, a localization data set defining at least one area,
- verifying by the verification means that the current localization is included in said area, and if so, transmitting an authorization message for the reception of the audiovisual content to the security means of said receiver.

The particularity of transmitted content is that it is sent to a plurality of receivers without the transmitter having a control over the receiver, as it happens in a point-to-point connection. This kind of transmission can be made by radio waves, by cable, by satellites or by broadcast over IP.

The particularity of this method is to use existing localization means of a portable device such as a smart accessory (mobile phone, tablet, multimedia reader) to complete the functionalities of the receiver. According to a particular embodiment, the portable device is the remote control of the receiver in which localization functions (such as a GPS) are integrated. The localization acquired by the remote control is then transmitted to the receiver.

The localization is not limited to GPS data but can be also obtained by reception of identifiers of antennas of mobile phone network or broadcast-type transmission with identifier of the transmitter. The identifier of such an antenna is thus a "localisation" in the sense of the present invention. The localization means include the acquisition of GPS coordinates, the acquisition of a mobile network or local broadcast identifier.

According to the different embodiments, it is considered that the security means are part of the receiver. The verification means can be integrated in the receiver or be part of a management centre. In the first case, the verification means as well as the security means may be only one security element located in the receiver. In the second case, the verification means of the management centre interact with the security means of the receiver to authorize/forbid access to the content.

As mentioned above, the portable device includes localization means.

There are two types of portable device, the first type having its own communication means with the management centre and the second type in the impossibility to communicate with the management centre.

The remote control is part of the second category and will communicate the localization acquired directly to the receiver. To this aim the portable device has means for local communication with the receiver, which may be the infrared communication of the remote control, a connection according to NFC protocol or Bluetooth.

In the case of the first type, the communication of the localization can also be made directly to the receiver by local communication means (NFC, Bluetooth) or be addressed to the management centre. The devices of the first type may thus have local communication means and remote communication means. It is possible to have a device which has the two communication means (for example a smartphone) but only uses one kind of means in the context of this invention.

According to a preferred embodiment, the communication between the portable device and the receiver is secure. This means that only a portable device known by the receiver can communicate with it.

In order to achieve this aim, the data exchanged between the portable device and the receiver is encrypted by a key shared by the portable device and the receiver.

In case of the remote control, this key can be loaded in the two entities during initialization and no adjustment has to be done afterwards. In the case of a smart accessory, an initialization operation is to be done by the user before being able to authorize the dialogue with the receiver. This initialization allows to load the encryption key in the smart accessory corresponding to the receiver.

The receiver receives a message from the management centre of the totality of the receivers containing an instruction for localization verification. This message, transmitted by the broadcast means or via a dedicated channel, may be addressed to a receiver, a group of receivers, or all the receivers.

The message may contain a localization data set which will define the authorization area for the receiver or the group of receivers, or simply contain a verification command. In the latter case, the data set defining the authorization area has been memorized in the receiver, either at the initialization preceding the activation, or thanks to a setup message (EMM) sent to the receiver or to a group of receivers. In the case of a globally addressed message, if the message contains the data set defining the authorization area, this area defines the whole activity area of the operator. The data set can be in the form of several points of geographic coordinates (for example 3 to define a triangle) defining a polygon containing the authorization area. This set can be a list of antenna identifiers to which the smart accessory is supposed to connect, for example mobile phone network antennas or DVB-H transmission antenna.

Once the message is received by the receiver, a unique code is determined by the receiver, which code may be either contained in the verification message or generated by the receiver. This code is also transmitted to the verification means, or the data allowing the verification means to verify the code. The unique code is then transmitted to the portable device, either in an electronic way by using local communication means (Bluetooth; NFC) or via the display of a piece of information on the screen, information which is then acquired by the portable device to obtain the unique code.

The user will thus use the portable device to acquire their position. In case of the remote control, a button triggers the research of the localization (for example research of the geolocation satellites) and the user may place themselves near a window to have a good reception.

Once the position is acquired, the portable device composes a localization message containing at least the current localization and the unique code. According to one embodiment, the receiver is located near the receiver and the transmission of the localization message can be done. According to another method, the receiver has remote communication means and can thus send the localization message directly to the management centre.

The receiver extracts from the data a localization and control data. The control data is used to ensure that the localization has just taken place by verifying for example the date attached to the data.

In the mode in which the portable device has means for communication with the management centre, these localization data are transmitted to the management centre which has two options, either directly carrying out the verification to ensure that the localization is in the authorized area (the verification means are thus at the management centre), or transmit, in a personal message (EMM), this localization to the receiver for it to carry out the verification (the verification means are thus in the receiver).

BRIEF DESCRIPTION OF THE DRAWINGS

The present application will be better understood thanks to the detailed description based on the figures.

DETAILED DESCRIPTION

Figure 1:
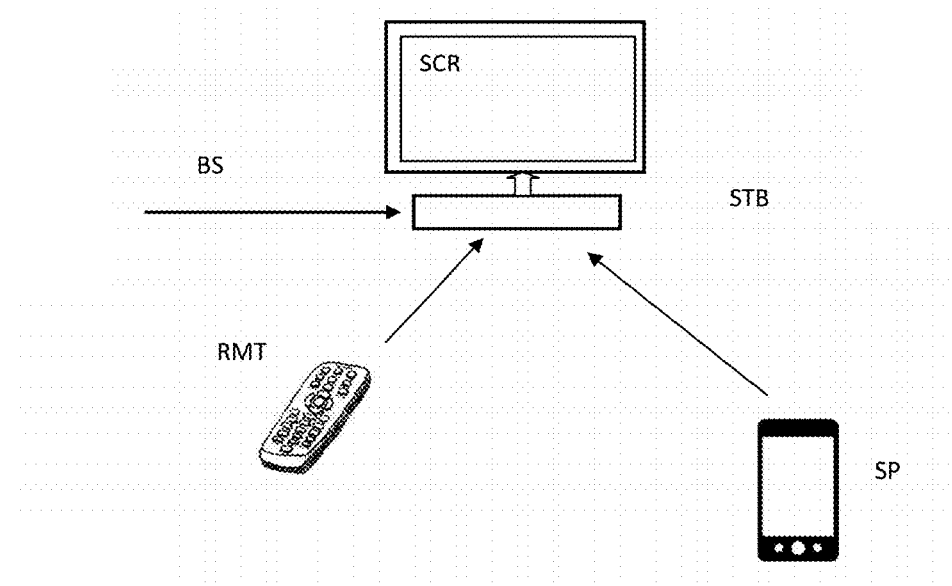
FIG. 1 shows the system of the invention.

Several ways of realisation are proposed in the context of the present application. The common points are:

- a receiver STB receives transmitted data for which it is desired to geographically control the access,
- a screen SCR is connected to the receiver and allows to display the transmitted data,
- a portable device which is not connected in a permanent way to the receiver, allows to acquire a localization. This localization can be a geolocation (GPS) or the reception of an identifier transmitted by a local antenna. This antenna can be a mobile phone network antenna (GSM) or a broadcast antenna of the type DVB-H,
- verification means, which contain one or more reference localizations and which allow to verify if the current localization, as acquired by the portable device, is in an authorization area. These reference data can be specific to a user, a user group, or all the receivers of an operator.
- a transmission by the portable device of the acquired localization towards the verification means in order to carry out the above described verification,
- security means, connected to the receiver, to authorize or forbid the access to the transmitted data, according to the result of the verification done by the verification means,
- a unique code, unique in the sense that it will not be reutilized during the next localization verification, is transmitted from the receiver to the portable device, the latter associating the localization data with the unique code, the verification means being capable of verifying the authenticity of said unique code received with the localization data. This code is unique per verification process, namely it can further be unique per receiver or the same at a given time on several receivers.

The user's receiver STB includes means for receiving a flow of transmitted audiovisual data. Several reception types can be supported by the receiver like reception by cable, by satellite, over the air or by IP flow. All these flows have in common the fact that the same flow is transmitted to a large number of receivers and that is why the implementation of the access authorization verification is done at the receiver level. The field of the present application also covers on-demand transmission such as VOD, Replay TV. Preferably, the receiver has security means which can be in several forms:

- a dedicated circuit, mounted on the printed circuit of the receiver and which carries out all the security operations. This circuit contains a secure memory which stores the keys and the rights of the user.
- a silicon area of a specialized circuit. The specialized circuit integrates all the functions of the receiver, in particular the selection of a flow among several flows, the separation of the audio and video flows, the decompression, and the management of the display. A section of this circuit is reserved to security operations and contains a secure memory storing the data specific to a user.
- an independent module, such as a dongle or a smart card comprising processing means and at least one secure memory. This module is connected for example by an USB connector or ISO 7816. The receiver filters the management messages of the access control system and sends them to the independent module. The latter treats them and sends back the keys or information useful for the functioning of the receiver.
- a software module. The central unit of the receiver can treat several contexts and the security function is a software which is executed by the same central unit as the management of the receiver. A special section of the memory is reserved to this programme and the access to the other programmes running on the receiver is limited.

A receiver is identified by a unique number UA. This number is stored preferably in a memory of the receiver in a permanent way so as not to be able to be modified without authorization. This number is not necessarily secret and it is generally printed on the back of the receiver.

According to a particular form, the receiver is a module which connects in a connector of the screen. A known form is the module PCMCIA but other types of connection (such as USB, FireWire) are possible. In this case, the supply is provided by the screen and the dialogue with the user transits through the connector and uses the means (remote control) of the screen. These modules are known under the name of CAM (Conditional Access Module).

Unique Code

This unique code is at least unique per verification session and will not be reutilized during another verification stage. It can be generated by the management centre and sent in the invitation message to verification or be generated by the receiver such as a random number. In this case, it will further be unique per receiver.

This code is then transmitted to the portable device. This can be done either by the mediation of the screen (display of the code on the screen and re-transcription in the portable device) or directly transmitted thanks to local communication means to the portable device.

This unique code must be verifiable by the verification means. To this aim, these means also receive the unique code generated in order to be able to compare it with the one transmitted with the current localization. Alternatively, the verification means do not receive the unique code but can verify the authenticity of said code via the personal key of the receiver. In this case, the verification means contain the personal key of the receiver and a means to identify the receiver in order to be able to find its key. By decrypting the unique code received with the personal key of the receiver supposed to have produced this unique code, the verification means can verify that the decoded code meets the rules fixed and known by the receiver and the verification means. For example, the unique code can be the result of an encryption of the current date by the personal key of the receiver. The verification means receive the unique code and the identifier of the receiver. Thanks to this identifier, the personal key is retrieved and applied on the unique code. The result of the decryption should have the format of a date (ex. year, month, day) for the code to be considered as authentic.

Several variants of this unique code are provided within the context of the invention:

- this code is contained in the invitation message and thus generated at the management centre. The invitation message can be global, that is the unique code will be the same for all the receivers, or with unique addressing, allowing to generate, by the management centre, a unique code for each receiver. If the verification means are located in the management centre, the unique code is directly transmitted to said means.
- this code is generated by the receiver. It can be a random number or a datum such as the hour or the date combined with a personal key. For example, date and time are encrypted by this key and form the code. The management centre, after having received the message from the smart accessory comprising code and localization, can verify the code received by decrypting this code with the personal key of the receiver. This key is retrieved by identifying the smart accessory and the receiver to which it is associated. Once the receiver is known, the personal key which is stored in a database of the management centre is retrieved. Once the code is decoded, it is possible to verify that the hour and the date correspond to a time window following the transmission of the message by the management centre and thus to validate the unique code.

In case of the transmission of this code onto the screen, the display of this code can be done in an alphanumeric or graphic form. In this case this code is in the form of an image of the barcode or QR code type, the smart accessory comprising a camera for reading this code. This image can contain a large quantity of information such as the identifier of the receiver or security means, the date and/or the hour, a unique code. This image is acquired by a camera of the smart accessory and converted by said accessory into a data string. This string is then associated to the localization data which is transmitted to the management centre. The management centre will be able to verify, in addition to the localization, that the string corresponds to the image displayed by the receiver.

First Embodiment

Figure 2:
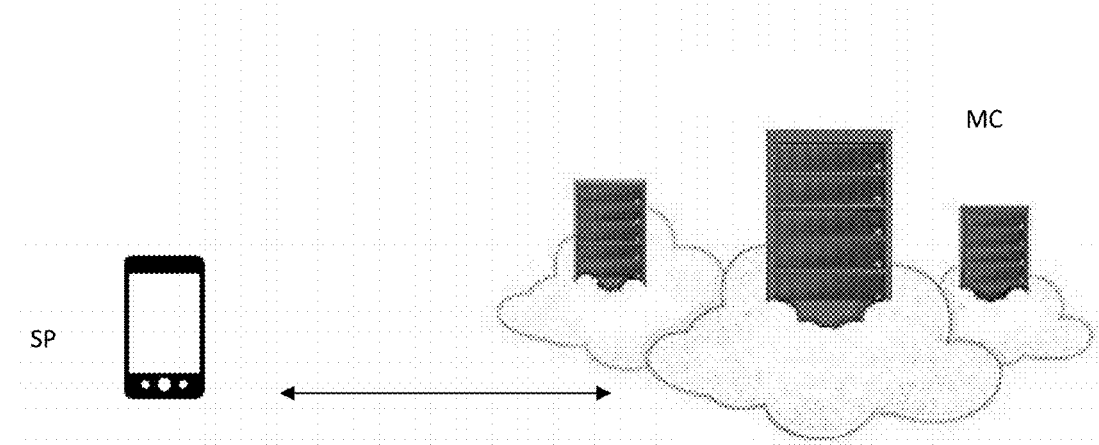
FIG. 2 shows the communication operation between a smart accessory and a management centre.

This first mode is characterized in that the current localization, acquired by the portable device, is transmitted to the receiver. It is shown by figures 1 and 2. The local device can be the remote control RMT of the receiver (or of the screen SCR in the case of the CAM module) and the communication may simply be infrared connection. The remote control may have another communication channel such as Bluetooth or NFC. Once the localization has been acquired and temporarily memorized in the remote control, the user approaches the receiver and launches the transfer of this localization towards the receiver STB. The unique code previously received is joined to the localization data. In order to secure this localization, the data sent by the remote control can be further encrypted by a key previously loaded in the receiver and the remote control. Thus, a couple is created not to allow another remote control to be used for this purpose.

In the mode using a smart accessory SP, the principle is the same, that is the latter acquires the current localization (either by GPS, by an antenna identifier, or by transmitter triangulation such as of mobile phone network) and transmits it to the receiver STB by local communication means with the unique code previously received. In one embodiment, the communication of the exchanged data is secured by an encryption. The encryption key can be loaded by a preliminary connection by the smart accessory to a management centre during an initialization process. During this process, the smart accessory receives an invitation to identify the receiver for example by indicating its identifier. The management centre searches its database for the encryption key corresponding to said receiver and sends it to the smart accessory. The latter stores this key and uses it for transmitting the localization data to the receiver.

The management centre can also send an application which is loaded on the smart accessory and which will manage the localization acquisition and the transmission of this data to the receiver. This application will have the personal encryption key of the receiver dissimulated in the application.

This localization operation is released by an invitation message transmitted by the management centre to the receivers to which it is connected. The message can be sent in the transmitted signal BS or addressed to a receiver via a direct connection (by IP protocol by example). This message triggers the obtainment of the unique code according to the above description.

The invitation message will also be able to comprise a maximum duration which is memorized by the receiver, preferably in its security means. This information allows to verify a duration that was necessary to obtain a response of the portable device. During the reception of the localization data and of the unique code, the duration between the apparition of the message and the reception of the data is calculated and compared to the maximum duration. If this calculated duration is superior to the maximum duration, the verification leads to the rejection of the current localization.

It may happen that the invitation message arrives at an inconvenient time and the window which invites the user to verify includes a delay option. The user has the possibility for example to postpone this verification by 30 minutes. Once the time has elapsed and the user is ready to carry out the verification, the receiver transmits the unique code. Without the introduction of this code, the localization by the portable device cannot start. It is thus not possible to take advantage of the 30-minute delay to move the portable device to another area.

Once the localization has been established by the portable device, the data is sent to the receiver with the unique code previously introduced. The receiver can then verify that the received code is the same as the one displayed with the invitation and calculate the current duration. If the code is correct and the duration does not exceed the maximum duration contained in the message, the localization is accepted.

Once this step is over, the receiver has two options, either doing the verification itself or delegating this verification to the management centre.

In the first case, this means that the verification means are contained in the receiver. These means are located with the security means. The receiver has first transmitted the unique code to said verification means. The verification means have a memory containing the localization data defining at least one authorization area. These data can be in the form of a surface defined by the geolocation positions or a set of antenna identifiers in the case of a localization by antenna identifier. The verification means verify that the unique code received from the portable device is correct, and if so, they verify that the current localization received from the portable device is within the area. If so, the receiver continues to function as usual. In the negative, the receiver can take different measures such as the transmission of a message to a management centre (this message comprising the identifier of the receiver and the type of problem observed), or block, limit, or degrade the functionalities of the receiver (for example by blocking the HD content and leaving the SD content).

For carrying out this verification, the verification means must have the authorization area. This information can be contained in the invitation message or be already present in the verification means, for example loaded during an initialization phase or by the reception of a setup message such as an EMM (Entitlement Management Message).

In the second case, the receiver can have a means for communication with the management centre, for example by an IP connection. The current localization and the unique code received from the portable device are sent to the management centre with the identifier of the receiver. The management centre includes the verification means which will, for the received identifier, retrieve the authorization area and verify if the current localization is comprised in the area as well as verify the unique code.

The management centre can take several measures if the current localization is outside the area:
- mark this identifier as blocked and no longer send messages containing the keys which allow the continuation of the reception for this receiver; the keys are periodically renewed and the receiver has to receive the new keys to access the content, and/or
- send a blocking message, either by broadcasting, or by the IP way; this message is treated by the security means of the receiver which will cease to supply the decryption keys to the decoder of the receiver.

Conversely, if the localization is inside the area, the management centre can also send an EMM message which will renew the expiration date of the reception rights. This message can be sent immediately after the verification or later when the keys of the content encryption system change.

Second Embodiment

This second mode is characterized in that the current localization, acquired by the portable device, is transmitted directly to the management centre with the unique code. For this purpose, the portable device includes means for localization and remote communication with the management centre, for example by the Wi-Fi network, or 3G/4G. This will then be the case of a smart accessory.

This mode is preferably associated to a specific application loaded in the smart accessory which executes the operation of acquisition of the localization and the transmission of the data. This localization is triggered in the same way as previously, that is the transmission of the unique code from the receiver towards the portable device according to one of the above described methods.

The management centre can take several measures if the current localization is outside the area:

mark this identifier as blocked and no longer send messages containing the keys which allow the continuation of the reception for this receiver; the keys are periodically renewed and the receivers have to receive the new key to access the content, and/or send a blocking message, either by broadcasting, or by the IP way; this message is treated by the security means of the receiver which will cease to supply the decryption keys to the decoder of the receiver.

Conversely, if the localization is inside the area, the management centre can also send an EMM message which will renew the expiration date of the reception rights.

Third Embodiment

Figure 3:
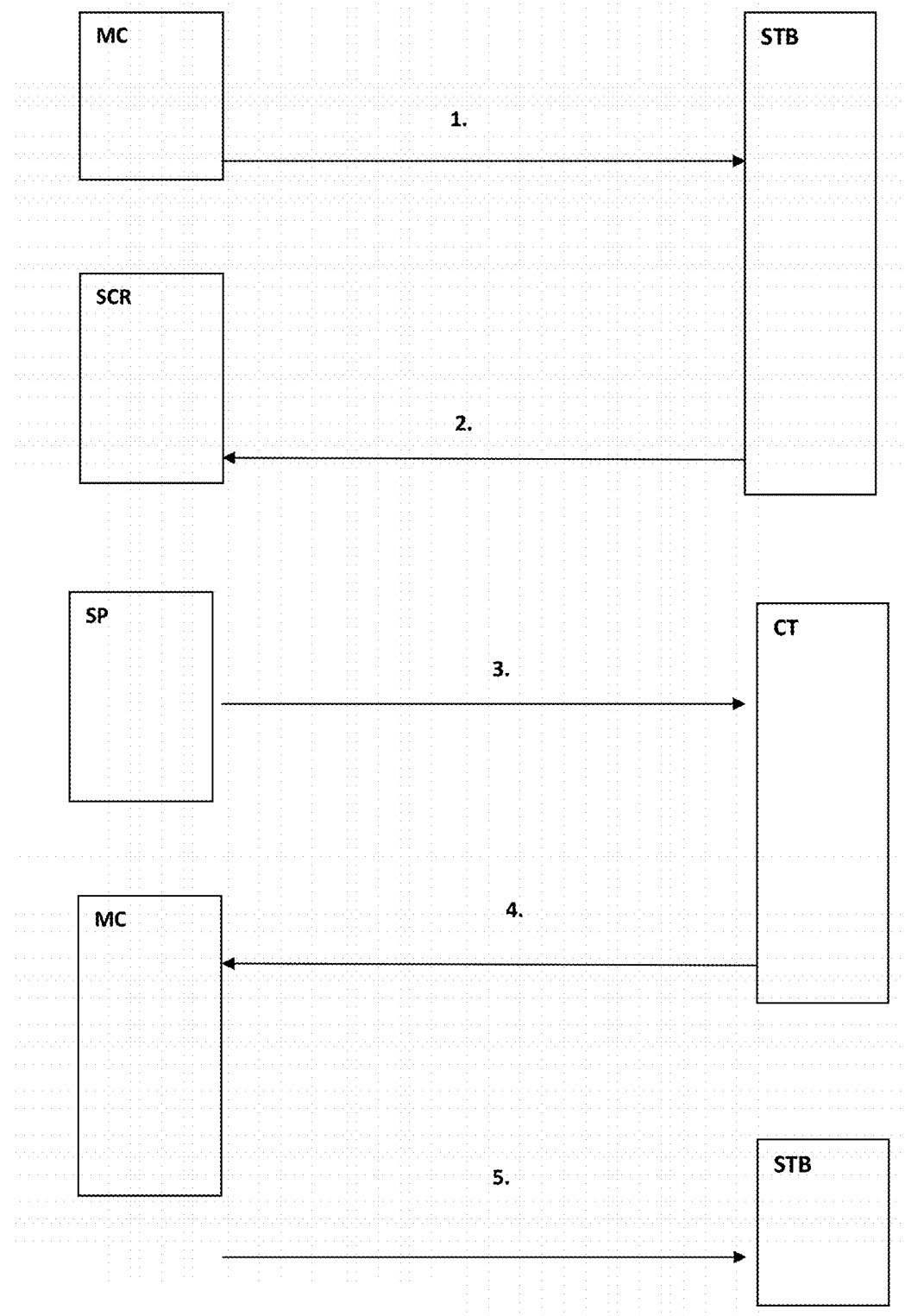
FIG. 3 shows the data exchange using the SMS technique.
Figure 4:
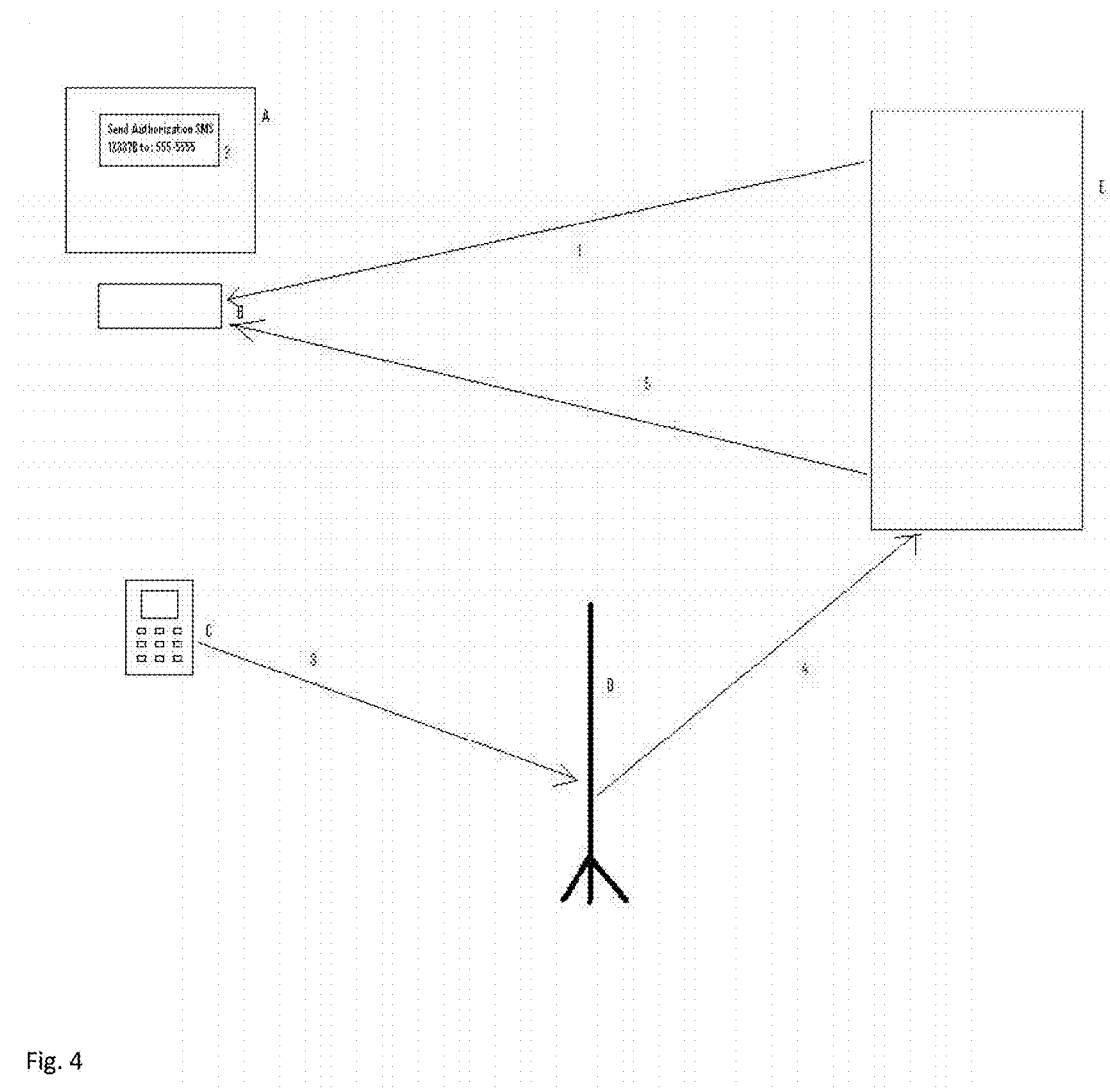
FIG. 4 shows the elements in the data exchange using the SMS technique.
Figure 5:
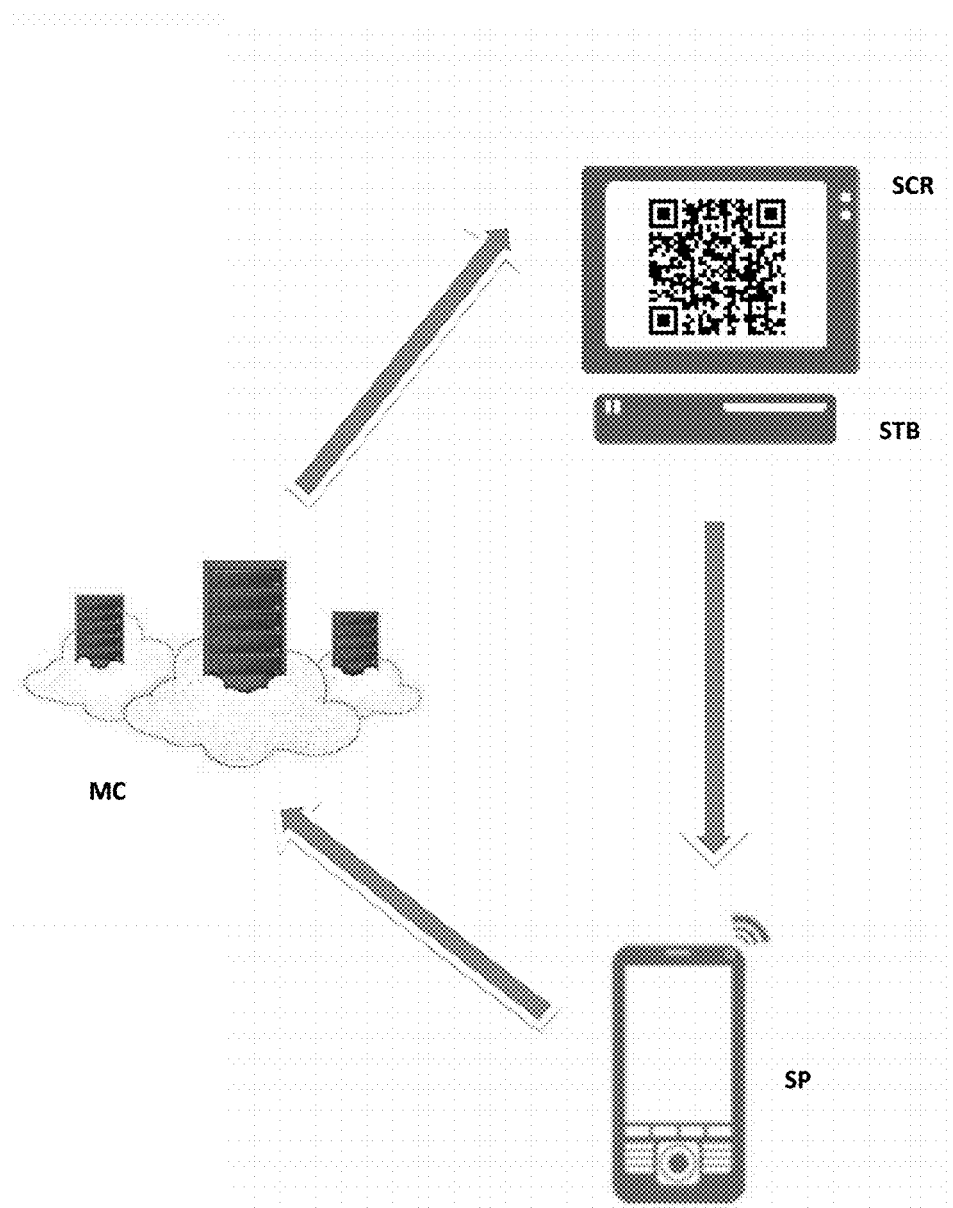
FIG. 5 shows the display of an identification code on the screen of the receiver.

This third mode is based on an intrinsic localization of a message received by the management centre MC. It is shown in FIGS. 3 and 4. It resumes all the explanations of the previous methods relating to the mode in which the portable device directly communicates with the management centre. To this aim the portable device can be a simple mobile phone without additional functionality.

The particularity is that the portable device can be a mobile phone without localization means. It will not need to acquire its localization. It will be only asked to send a SMS message to the management centre, containing for example the identifier of the receiver or an identification code displayed on the screen and contained in the invitation message. This information is not even necessary as the management centre, by knowing the telephone number, can retrieve the identifier of the receiver to which it is associated. The code can be produced according to the above described embodiments.

The mobile phone sends a message 3 to the management centre by using the nearest communication tower CT. The communication tower CT relays the message 4 to the management centre by adding service data such as the identifier of the tower CT.

At the reception of the message 4 by the management centre, the latter extracts the service data in order to identify the tower which served as first relay to the message sent by the mobile phone. This identifier becomes the current localization as described in relation with the above methods. The telephone number associated with the message allows to retrieve the identifier of the receiver and thus its data of authorization area(s).

The same options previously discussed in relation with the response of the management centre are applicable here. The EMM message (for example blocking or renewal message) is shown with reference 5 in FIGS. 3 and 4.

Independent GPS Module

In the context of this invention, an independent GPS module with autonomous supply is proposed, comprising means for wireless communication with the receiver (such as Bluetooth). The position of such a module has to be near a window or located outside, which can make the supply via the network difficult. That is why this independent GPS module is proposed, supplied by accumulator, battery, and/or solar collector. An important point is that this module can be in standby mode most of the time. According to one embodiment, said module can comprise a clock which will awake the module at a given time. According to a first embodiment, the receiver permanently listens to the messages transmitted by said module. A message will comprise the localization and can also comprise a module identifier. According to this mode, the module will transmit the current localization at regular intervals. The latter is memorized in the receiver and when a verification is requested by the management centre, the last received localization is used. In order to optimize the stand-by time of the GPS module, the management centre, in its invitation message to verification, may indicate when a successive verification will be done. This allows the receiver, during a communication with the GPS module, to indicate when it has to awake. The GPS module can thus be in standby mode (with a consumption compatible with a solar collector) during several days. Little time before the arrival of the message coming from the management centre, the clock of the GPS module awakes the module and a localization is acquired and transmitted to the receiver.

According to another embodiment, the activation of the GPS module is initiated by pressing a button. When the receiver displays the verification message, the user will press on the activation button of the GPS module which will supply the module. The module will engage the GPS chip and acquire the localization and transmit it towards the receiver. Then, the module returns to the standby mode.

In these embodiments, the module does not receive any unique code from the receiver. The short range of wireless transmission will be relied on for guaranteeing the proximity. It is nevertheless possible to store, in the module and in the receiver, an encryption key which is unique for this couple. Thus, even if a third party intercepts the message transmitted by the GPS module, it will not be understood by another receiver as the localization data are encrypted with the encryption key specific to only one couple module/receiver.

The above different methods and explanations allow to ensure that the receiver is in a place which is compatible with the reception rights.

The invention claimed is:

1. A method for controlling access to transmitted content, the method comprising:

receiving a verification invitation message by a first device;

generating a first unique code by the first device, the first unique code being a single use code, the single use code that will not be reused for any subsequent verification;

transmitting by the first device, to a verification module, said first unique code;

transmitting by the first device said first unique code to a second device, wherein the second device acquires a current geographic indication in response to receiving said first unique code;

receiving, by the first device, the current geographic indication and a second unique code from the second device;

transmitting to the verification module, the current geographic indication and the second unique code;

comparing, by the verification module, the second unique code with the first unique code; and in response to the second unique code being the same as the first unique code received from the first device by the second device:

extracting, from a memory of the verification module, a geographic indication data set defining at least one authorization area, verifying by the verification module that the current geographic indication is included in said at least one authorization area, and transmitting an authorization message for the reception of the transmitted content to a security module of said first device in response to the current geographic indication being included in the at least one authorization area;

wherein the verification module sends a blocking message to the security module to stop supplying decryption keys of the transmitted content to the first device in response to the current geographic indication being outside the at least one authorization area.

2. The method of claim 1, wherein the security module determines whether the reception of the current geographic indication and the second unique code is within a predetermined time limit of transmission of the first unique code to the second device.

3. The method according to claim 1, wherein the first device on reception of the verification invitation message, generates the first unique code and transmits the first unique code to the second device and to the verification module, and wherein the first unique code is unique to the first device.

4. The method according to claim 1, wherein the first device displays an alphanumeric image on a screen connected to the first device, the alpha numeric image representing the first unique code, and the second device comprises a keyboard for entering the first unique code.

5. The method according to claim 1, wherein the first device displays an image representing the first unique code, and further comprising:
  acquiring the image by an optical reading device of said second device; and
  converting the image to obtain the first unique code in order to add it to the current geographic indication.

6. The method according to claim 1, wherein the second device is a remote control for the first device.

7. The method according to claim 1, wherein the verification module is integrated into said first device, and the first device comprises a local interface to communicate with the second device to receive the current geographic indication and the second unique code.

8. The method according to claim 1, wherein the second device is a smart accessory comprising a Global Positioning System (GPS) module and having local interface to communicate with said first device, and said local interface using an encryption key to secure the message exchanges, further comprising:
  downloading and loading, by the smart accessory, an application in a memory of said smart accessory;
    accessing, by the smart accessory, a management center and identifying the first device at said management center;
    retrieving, by the smart accessory from the management center, an encryption key corresponding to said first device; and
    using, by the smart accessory, said encryption key to encrypt and/or sign the current geographic indication.

9. The method according to claim 1, wherein the verification module is located in a management center and wherein the second device includes a communication interface to communicate with said management center independent of the first device.

10. The method according to claim 1, wherein the verification module is located in the first device, and the second device includes a communication interface to communicate with a management center independent of the first device, said management center transmitting a message to said first device containing at least the first device geographic indication and the first unique code.

11. The method according to claim 1, wherein the first unique code includes a random number generated by the first device.

12. The method according to claim 1, wherein the first unique code is displayed on a screen as a QR code.

13. The method according to claim 1, further comprising:
  determining by the first device whether a request to delay the comparison of the second unique code with the first unique code is received;
  in response to determining that the request to delay the comparison of the second unique code with the first unique code is received, delaying transmission of the first unique code to the second device for a predetermined time period; and
  upon one of expiration of the predetermined time period or determination that the request to delay the comparison of the second unique code with the first unique code is not received, transmitting by the first device said first unique code to the second device.

14. A system for reception of transmitted content, the system comprising:
  a first device comprising a verification module, a security module and a screen output; and
  a second device,
  wherein the first device:
    generates a first unique code,
    transmits said first unique code to said verification module, and
    transmits the first unique code to said second device,
  wherein the second device:
    receives said first unique code,
    acquires a current geographic indication in response to receiving the first unique code, and
    transmits, to the first device, the current geographic indication and a second unique code, and
  wherein said verification module:
    receives the current geographic indication and the second unique code received from the second device,
    compares the second unique code received from the second device with the first unique code received from the first device,
    in response to the second unique code being the same as the first unique code, extracts from a memory of the verification module, a geographic indication data set defining at least one authorization area, determines whether the current geographic indication is included in the at least one authorization area, and
    in response to the current geographic indication being in the at least one authorization area, transmits an authorization message for the reception of the transmitted content to the security module;
  wherein the verification module sends a blocking message to the security module to stop supplying decryption keys of the transmitted content to the first device in response to the current geographic indication being outside the at least one authorization area.

15. The system of claim 14, wherein the security module determines whether the reception of the current geographic indication and the second unique code is within a predetermined time limit of transmission of the first unique code to the second device, and the security module rejects the current geographic indication in response to reception of the current geographic indication and the second unique code outside of the predetermined time limit.

16. The system according to claim 14, wherein the first device generates the first unique code, and transmits the first unique code to the screen output and to the verification module, and wherein the first unique code is unique to the first device.

17. The system according to claim 16, wherein the second device includes an optical reading device that acquires an image being displayed on a screen connected to the screen output and converting it in order to obtain the first unique code.

18. The system according to claim 14, wherein the second device is a remote control that controls the first device, or a smart phone.

19. A receiver for reception of transmitted content, comprising:
 an interface for receiving the content;
 a verification module; and
 a security module;
 wherein the receiver:
  generates a first unique code and transmits the first unique code to a second device, wherein the second device acquires the first unique code from the receiver, and
  receives from the second device, a current geographic indication, the current geographic indication is acquired in response to the second device receiving the first unique code transmitted from the receiver,
 wherein said verification module:
  compares a second unique code received from the second device with the first unique code transmitted by the receiver to determine whether they are the same,
  in response to the second unique code being the same as the first unique code received from the receiver, extracts from a memory of the verification module, a geographic indication data set defining at least one authorization area,
  determines whether the current geographic indication is included in the at least one authorization area,
  in response to the current geographic indication being in the at least one authorization area, transmits an authorization message for the reception of the transmitted content to the security module, and
  sends a blocking message to the security module to stop supplying decryption keys of the transmitted content to the first device in response to the current geographic indication being outside the at least one authorization area.

20. The receiver of claim 19, wherein the security module determines whether the reception of the current geographic indication and the second unique code is within a predetermined time limit of transmission of the first unique code to the second device, and the security module rejects the current geographic indication in response to reception of the current geographic indication and the second unique code outside of the predetermined time limit.

\* \* \* \* \*